(12) United States Patent
Sasaki

(10) Patent No.: US 6,754,178 B1
(45) Date of Patent: *Jun. 22, 2004

(54) IMAGE COMMUNICATION APPARATUS AND IMAGE COMMUNICATION METHOD

(75) Inventor: Akitomo Sasaki, Kawasaki (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,390

(22) Filed: Jan. 29, 1997

(30) Foreign Application Priority Data

Jan. 30, 1996 (JP) .............................................. 8-014691

(51) Int. Cl.[7] .................................................. H04N 7/18
(52) U.S. Cl. ...................................... 370/235; 348/153
(58) Field of Search ................................ 370/236, 419, 370/465, 235, 229, 470, 471, 473; 348/159, 143; 379/93.08, 93.05, 93.06; 455/4.2, 4.1; 340/825.52; 1/1; 395/200.75, 200.76, 200.77, 200.81, 200.83, 200.47

(56) References Cited

U.S. PATENT DOCUMENTS

| | | | | |
|---|---|---|---|---|
| 3,580,998 A | * | 5/1971 | Hammond et al. | |
| 4,037,250 A | * | 7/1977 | McGahan | 178/6 |
| 4,860,101 A | * | 8/1989 | Pshtissky et al. | 358/149 |
| 5,105,183 A | * | 4/1992 | Beckmann | 340/717 |
| 5,258,837 A | * | 11/1993 | Gormley | 358/140 |
| 5,483,530 A | * | 1/1996 | Davis et al. | 370/465 |
| 5,502,727 A | * | 3/1996 | Cantanzaro et al. | 370/419 X |
| 5,544,315 A | * | 8/1996 | Lehfeldt et al. | 395/200.76 X |
| 5,550,584 A | * | 8/1996 | Yamada | 348/159 X |
| 5,550,756 A | * | 8/1996 | Ohmi et al. | 395/200.77 |
| 5,606,364 A | * | 2/1997 | Kim | 348/159 |
| 6,008,867 A | * | 12/1999 | Cooper et al. | 348/705 |

* cited by examiner

*Primary Examiner*—Kenneth Vanderpuye
(74) *Attorney, Agent, or Firm*—Morgan & Finnegan, L.L.P.

(57) ABSTRACT

Collision occurring on a network is reduced in a multi-point image display system for transmitting and receiving images among multiple points and receiving and displaying the image transmitted from one point at a remote point. An image communication terminal used for the multi-point image display system includes a system for issuing an image transmission request to request the transmission of the image to a plurality of image communication terminals disposed at the multiple points, a system for detecting whether the transmission of predetermined image units in the transmission of the image conducted in response to the image transmission request has been completed or not, and a system for notifying the image transmission request to the image transmission terminals when the completion of the transmission of the predetermined image units is detected and controlling the terminals to which the image transmission request is notified in a predetermined order to allow the ordered transmission of the image packets from the image transmission terminals.

16 Claims, 8 Drawing Sheets

IMAGE COMMUNICATION APPARATUS AND IMAGE COMMUNICATION METHOD

BACKGROUND OF THE INVENTION

1. Field of the Invention

The present invention relates to an image communication apparatus and an image communication method.

2. Related Background Art

FIG. 10 shows a conceptual view of a prior art computer based multi-point image display system. In the multi-point image display system shown in FIG. 10, image communication terminals 1202, 1203, 1204, 1205 and 1206 are connected to a network 1120 to form a multi-point image display system which allows mutual communication of images, voices and data among image communication terminals. In FIG. 10, numeral 1201 denotes a communication terminal housing.

The network 1120 is a bus type network such as Ethernet (trademark). In the present example, the image communication terminals 1203, 1204, 1205 and 1206 are image transmission terminals.

In the above prior art apparatus, when a plurality of image transmission terminals 1203–1206 simultaneously transmit images, collisions (a plurality of communication terminals transmit packets simultaneously and the packets are broken) occur on the network 1120 and image packets may be lost. As a result, the images cannot be successfully reproduced.

SUMMARY OF THE INVENTION

It is an object of the present invention to solve the above problem.

It is another object of the present invention to reduce the collision occurring on the network.

It is other object of the present invention to permit immediate operation for displaying the images after a plurality of image packets have been received.

The present invention is featured by forming the image by an image forming request noticed by request notifying means and notifying the image forming request before an image transmission request.

It is a further object of the present invention to provide an image communication apparatus and an image communication method which have a novel function.

DETAILED DESCRIPTION OF THE PREFERRED EMBODIMENTS

First Embodiment

In the present embodiment, an image control terminal is added to the image transmission terminals shown in the prior art apparatus. The image control terminal applies an image transmission command to each image transmission terminal to reduce the collision on the network.

Figure 1:
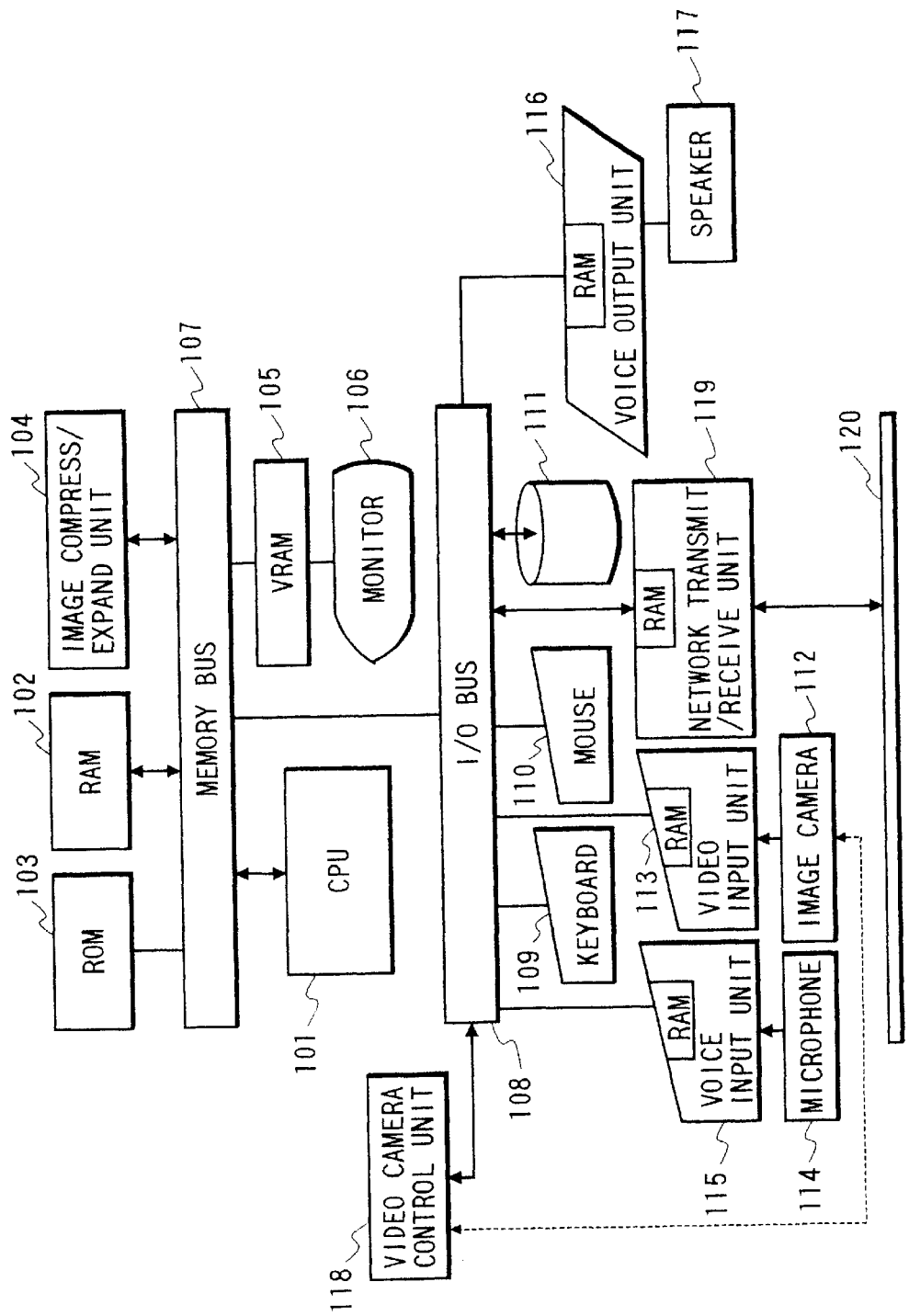
FIG. 1 shows a block diagram of an image communication terminal in accordance with one embodiment of the present invention.

FIG. 1 shows a block diagram of a configuration of an image communication terminal of the first embodiment. In FIG. 1, numeral 101 denotes a CPU for controlling the entire system, numeral 102 denotes a RAM, numeral 103 denotes a ROM which stores a program for loading an OS (operating system) to the RAM 102 or a program for executing other processes to be described later, and fixed data.

Numeral 104 denotes an image compress/expand circuit for compressing and expanding image data by any compression method (Motion JPEG, H.261 or MPEG) and numeral 105 denotes a VRAM for storing image data to be displayed on a display monitor 106. Those units are connected to a memory bus 107 so that data may be mutually transferred.

An I/O bus 108 is connected to the memory bus 107, and connected to the I/O bus 108 are a keyboard 109, a mouse 110, an external storage (such as a hard disk) 111, an image input unit 113 to which a video camera 112 is connected, a voice input unit 115 to which a microphone 114 is connected, a voice output unit 116 for supplying a voice signal to a speaker 117, a camera control circuit 118 for controlling panning, tilting and zooming of the video camera 112 and a network transmit/receive unit 119 connected to the network 120.

The image input unit 113 converts an analog image signal outputted from the video camera 112 to a digital signal and stores it in the internal RAM.

The voice input unit 115 converts an analog voice signal outputted from the microphone 114 to a digital signal and stores it in the internal RAM.

The CPU 101 may access to the image data stored in the RAM of the image input unit 113 and the voice data stored in the RAM of the voice input unit through the memory bus 107 and the I/O bus 108.

The voice output unit 116 comprises a RAM for temporarily storing the voice data from the I/O bus 108, and the voice data stored in the RAM is sequentially converted to an analog signal and it is outputted to the speaker 117.

In the above configuration, various functions in the image communication terminal of the present embodiment are attained by the computer comprising the CPU 101, the RAM 102 and the ROM 103.

Namely, it comprises image transmission request issuing means for issuing an image transmission request for requesting the transmission of image to a plurality of image communication terminals arranged at multiple points, image transmission means for transmitting an image of predetermined image units in accordance with the image transmission request sent from the image transmission request issuing means, end of image transmission detection means for detecting whether the transmission of the predetermined image units conducted by said image transmission means is completed or not, and order of notice control means for notifying the image transmission request to the image communication terminal which is conducting the image transmission when the end of image transmission detection means detects the end of the transmission of the predetermined transmission units and controlling the order of notice of the image transmission request to a predetermined order.

Figure 2:
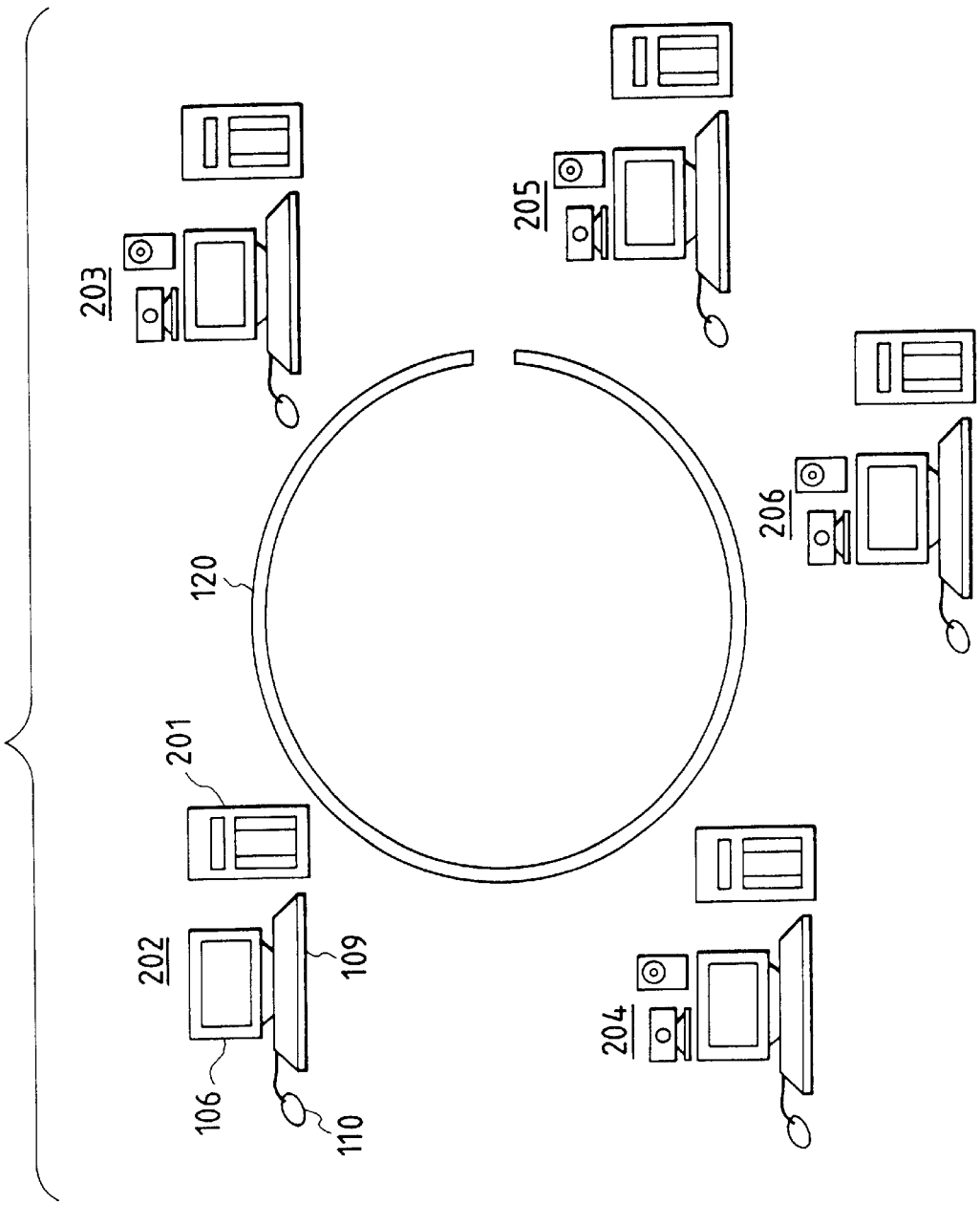
FIG. 2 shows a schematic view of a multi-point image display system of the present invention.

The image communication terminals 202, 203, 204, 205 and 206 thus constructed are connected to the network 120 of FIG. 2 to form the multi-point image display system which allows mutual communication of images, voices and data.

In FIG. 2, numeral 201 denotes a communication terminal housing which accommodates the CPU 101, the RAM 102, the ROM 103, the image compress/expand circuit 104, the VRAM 105, the memory bus 107, the I/O bus 108, the external storage 111, the image input unit 113, the voice input unit 115, the voice output unit 116, the camera control circuit 118 and the network transmit/receive unit 119 of FIG. 1.

The network 120 is a bus type network such as Ethernet (TM) although the present embodiment is not limited to a particular network. In the present embodiment, the image communication terminals 203, 204, 205 and 206 are described as the image transmission terminals.

Those image transmission terminals 203–206 transmit the images to the image receiving terminal 202. The image receiving terminal 202 displays the transmitted images to form the multi-point image display system. The terminals 202–206 are basically of the same construction except the presence or absence of the video camera. Namely, the image communication terminal may be set as the image transmission terminal or the image receiving terminals by user setting.

Figure 3:
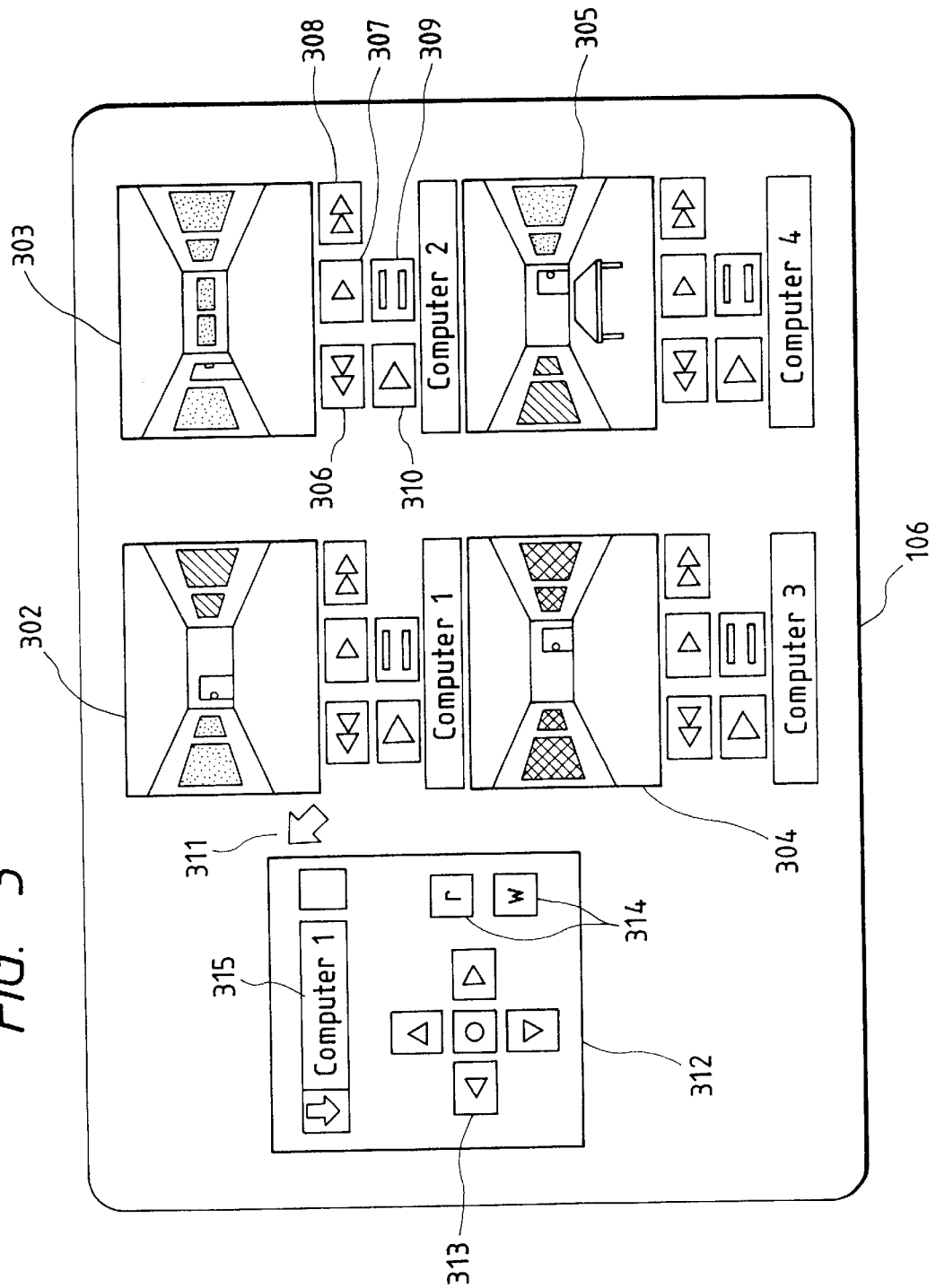
FIG. 3 shows an example of image display of an image receiving terminal of the present invention.

FIG. 3 shows an example of image display on the monitor 106. In FIG. 3, numeral 312 denotes a camera manipulation interface which comprises buttons for an image pick-up orientation command unit 313 and a magnification command unit 314, and a camera name indication column 315 for indicating a controlled object.

Numerals 302, 303, 304 and 305 denote image display windows. Usually, they display picked-up images of the video cameras 112 connected the image transmission terminals 203, 204, 205 and 206 which form the multi-point image display system. In the present embodiment, as shown in FIG. 2, the images from four image transmission terminals 203–206 are displayed, and four image display windows 302, 303, 304 and 305 are provided.

The image windows 302–305 may be used to reproduce and display the record images stored in the corresponding image transmission terminals 203–206.

To this end, buttons for controlling the image reproduction (rewind button 306, start of play button 307, fast forward button 308 and stop of play button 309) and a switching button 310 for switching between the record image stored in the external storage 111 and the current image are arranged below the image display windows 302–305. The record image may be received from a database (not shown) through the network 120. Further image display windows may be provided to display any current images and record images so long as there is a room on the screen of the monitor 106.

As is well known, a mouse cursor 311 may be moved by the mouse 110 to conduct a predetermined operation on the camera manipulation interface 312 or on various buttons 306–314 so that the user may input a desired command to the CPU 101.

A basic operation when the images and data are transmitted through the network 120, which is conducted by the image communication terminals 203–206 is now explained.

The image input unit 113 converts the analog signal outputted from the video camera 112 to the digital signal and develops it into the internal RAM. The CPU 101 reads the image from the RAM in the image input unit 113, develops it into the RAM 102 and packetizes the data and outputs it to the network 120 from the network transmit/receive unit 119. The packet is transmitted from the first image transmission terminal 203, for example, to the image receiving terminal 202 through the network 120.

When the network transmit/receive unit 119 of the image receiving terminal 202 detects the arrival of the packet from the network 120, the network transmit/receive unit 119 develops the packet into the internal RAM and notifies the reception of the packet to the CPU 101. The CPU 101 reads the data from the RAM of the network transmit/receive unit 119 and develops it into the RAM 102. The CPU 101 reads the image data contained in the packet and writes it into a predetermined position of the VRAM 105.

For example, when the received image is to be displayed on the first image display window 302, the received image data is written at the address of the VRAM 105 corresponding to the position of the first image display window 302. Thus, the image from the image transmission terminal is displayed on the assigned image display window 302–305.

At the image transmission terminal, the voice inputted from the microphone 114 is converted to the digital signal by the voice input unit 115 and it is developed into the internal RAM. The CPU 101 reads the voice data from the RAM of the voice input unit 115, develops it into the RAM 102 and packetizes the data and outputs it to the network transmit/receive unit 119. The packet is transmitted to the image receiving terminal 202 through the network 120. For example, it is transmitted from the first image transmission terminal 203 to the image receiving terminal 202.

At the image receiving terminal 202, when the network transmit/receive unit 119 detects the arrival of the packet from the network 120, the network transmit/receive unit 119 develops the packet into the internal RAM and notifies the reception of the packet to the CPU 101.

The CPU 101 reads the data from the RAM of the network transmit/receive unit 119 and writes it to the internal RAM of the voice output unit 116. The voice output unit 116 converts voice data stored in the internal RAM to the analog signal and outputs it to the speaker 117. Thus, the voice transmitted from the image transmission terminal is outputted to the image receiving terminal 202. In a similar manner, the voice from another image communication terminal or the voices a plurality of communication terminals are outputted. The image packet and the voice packet are accompanied with time information so that synchronous reproduction is conducted under control of the CPU 101.

The CPU 101 generates a camera manipulation command corresponding to a manipulation content, designates a camera to be manipulated and the image transmission terminal to which the camera is connected, and packetizes the camera control command and outputs it from the network transmit/receive unit 119 to the network 120.

The designated image transmission terminal reads the packet containing the camera control command from the network 120 and when it confirms that the content of the packet is the camera control command, it transfers the camera control command to the camera control unit 118 of the image transmission terminal.

The camera control unit 118 controls the panning, tilting and zooming of the video camera 112 in accordance with the input camera control command. In this manner, the video camera connected to another image communication terminal may be remotely manipulated through the network 120. Thus, the image at another point may be observed at the image receiving terminal 202 while remotely manipulating the video camera 112 connected to the image transmission terminal.

Figure 4:
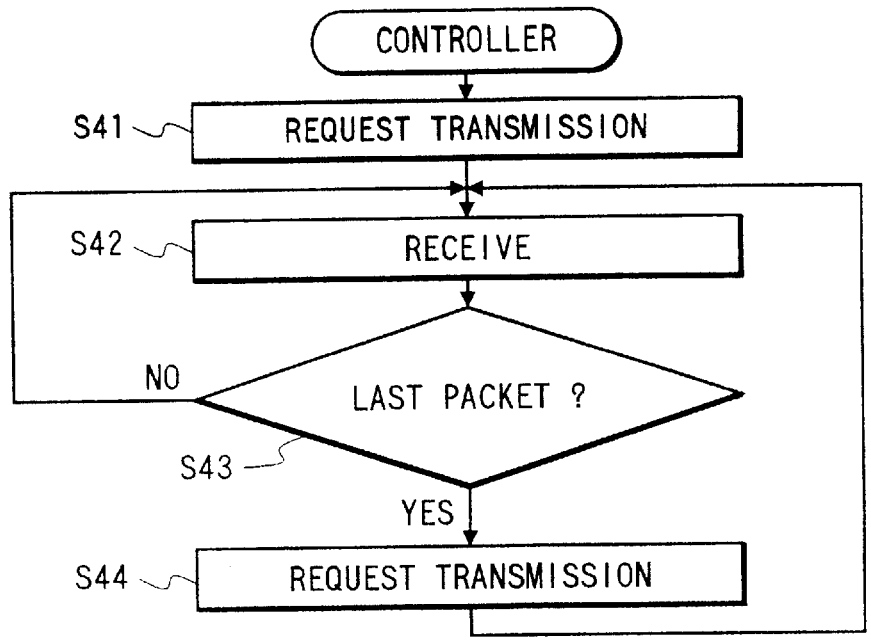
FIG. 4 shows a flow chart of an operation of an image control terminal in accordance with a first embodiment of the present invention.

Referring to FIGS. 2 and 4, an operation of the image control terminal provided in the multi-point image display system of the present embodiment is explained.

In FIG. 2, it is assumed that 206 is the image control terminal, information for controlling the first to third image transmission terminals 203–205 to transmit the images in order is stored in the external storage 111 of the image control terminal 206.

At the start, the image control terminal 206 outputs an image transmission request to the first image transmission terminal 203 (step S41) and waits for the reception of the image packet.

When the first image transmission terminal 203 transmits the image packet, the image control terminal 206 receives the image packet (step S42). The image control terminal 206 determines, while it receives the image packet, whether the received packet is the last packet of one screen of image packets or not (step S43). If the received image packet is not the last packet of the one screen of image packets, it again waits for the reception of the packet (step S43).

In the decision of the step S43, if the received packet is the last packet of the one screen of image packets, the process proceeds to a step S44 to transmit the transmission request to the next image transmission terminal, in the present embodiment, the second image transmission terminal 204.

The image control terminal 206 sequentially repeats the above operation for the first to third image transmission terminals 203–205.

Figure 5:
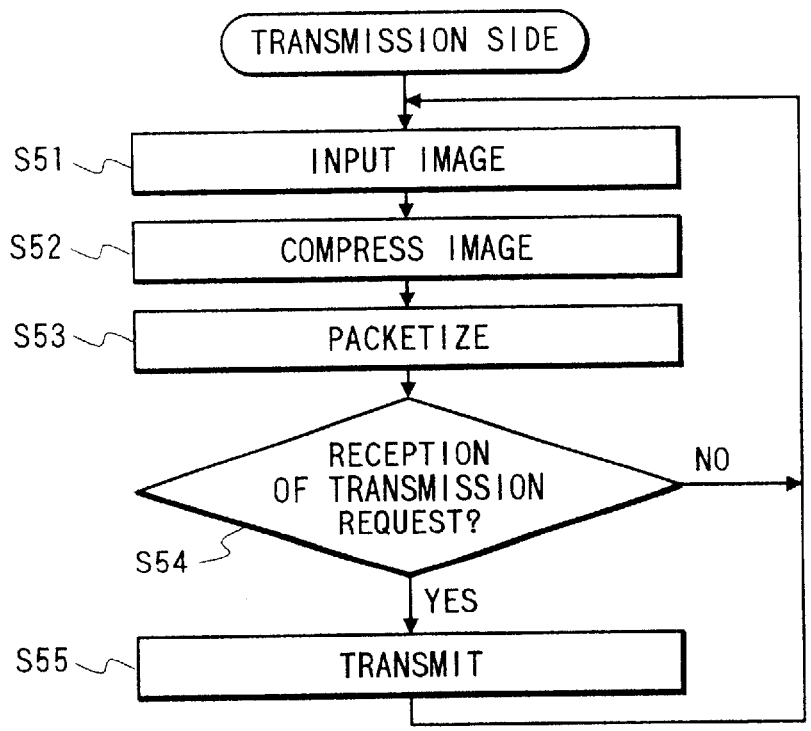
FIG. 5 shows a flow chart of an operation of an image transmission terminal in accordance with the first embodiment of the present invention.

Referring to FIGS. 1 and 5, the operation of the image transmission terminals 203–205 is explained.

As shown in FIG. 5, the image is first inputted from the image input unit 113 (step S51).

The input image data is then compressed by the image compress/expand circuit 104 (step S52).

The compressed image data is divided into sizes which can be transmitted through the network 120 and they are packetized by adding a network header (step S53).

Then, whether the image transmission request has been received from the image control terminal 206 or not is determined (step S54). If the image transmission request has not been received, the process returns to the step S51 to input the image again.

On the other hand, in the above decision step S54, if the image transmission request has been received, the process proceeds to a step S55 to transmit the packetized image data.

Figure 6:
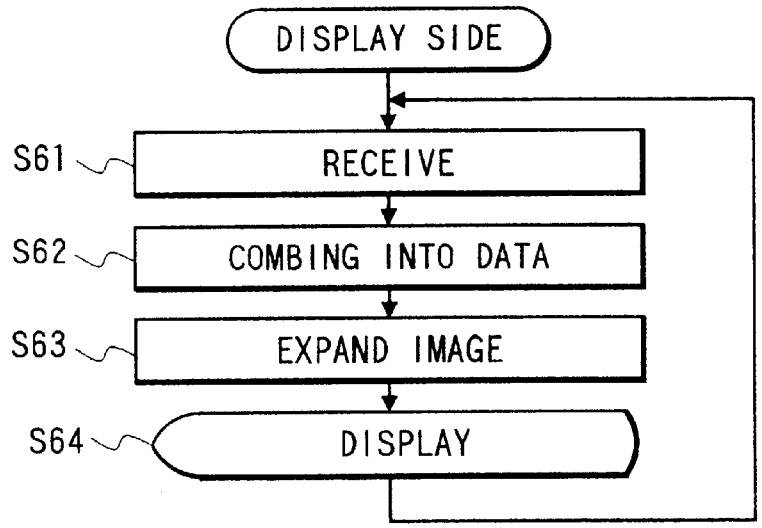
FIG. 6 shows a flow chart of an operation of an image receiving terminal in accordance with the first embodiment of the present invention.

Referring to FIG. 6, an operation of the image receiving terminal 202 is explained.

In a step S61, the image packet is received. In this case, the process waits until all image packets are received. When all packets have been received, the process proceeds to a step S62 to remove the headers of the image packets and combines them into one data.

In a step S63, the image data compressed by the image transmission terminal is expanded by the image compress/expand circuit 104. The expanded image data is displayed on the monitor 106.

In the multi-point image display system of the present embodiment, the image control terminal 206 is added to the image transmission terminal 203–205 and the image control terminal 206 outputs the image transmission request to the image transmission terminals 203–205.

The image transmission terminals 203–205 transmit the images in accordance with the image transmission request. When each of the image transmission terminals completes the transmission of one screen of image, the image control terminal 206 transmits the image transmission request to the next image transmission terminal. Thus, the transmission of the images is conducted in sequence by each of the image transmission terminals 203–205. Accordingly, in accordance with the multi-point image display system of the present embodiment, the collision on the network 120 may be positively reduced.

Since the operation of each image communication terminal is controlled by the program, the image control terminal 206 may be shared by the image transmission terminal or the image receiving terminal 202 so long as the image communication terminals can concurrently execute a plurality of programs.

In the present embodiment, the multi-point image display system has been described although the present invention is not limited to the above multi-point image display system but it may be equally applied to a TV conference system or a monitor system.

Second Embodiment

Major operations of the image display terminal 202 in the first embodiment are (1) the reception of all packets, (2) forming them into data, and (3) display. In the first embodiment, when the image transmission terminals 203–205 complete the transmission of the images, the transmission of the next image transmission terminal is started immediately. As a result, the image receiving terminal 202 may receive the image packet during the generation of the packets into data or the display of the image. In such a case, it may fail to receive the packet by the reason described below.

The received data in the RAM of the network transmit/receive unit 119 is structured to allow the reuse of the RAM location after the data has been read by the CPU 101. Accordingly, when a number of packets are received when the CPU 101 is heavily loaded such as during the display of the image, the RAM of the network transmit/receive unit 119 becomes full before the CPU 101 reads the received data of the RAM of the network transmit/receive unit 119 so that the packet cannot be received.

Figure 7:
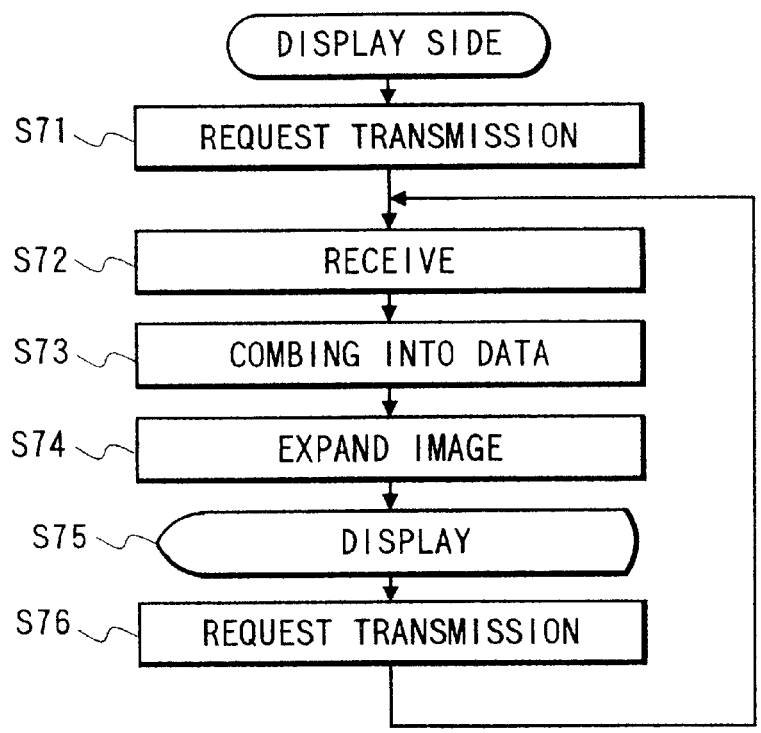
FIG. 7 shows a flow chart of an operation of an image receiving terminal in accordance with a second embodiment of the present invention.

The present embodiment is intended to avoid this problem. Referring to FIGS. 7 and 2, an operation of the image receiving terminal in the present embodiment is explained.

In FIG. 2, it is assumed that 202 is the image receiving terminal. Information indication that the image transmission terminals 203–206 transmit the images in order is stored in the external storage 111 of the image receiving terminal 202.

At the start, the image receiving terminal 202 outputs the image transmission request to the first image transmission terminal 203 (step S71) and waits for the reception of the image packet. When the image packets are transmitted, it receives all of one screen of image packets transmitted from the image transmission terminal (step S72).

When all of one screen of image packets have been received, the process proceeds to a step S73 to combine them into one data by removing the headers of the image packets.

The process then proceeds to a step S74 to expand the image data compressed by the image transmission terminal by using the image compress/expand circuit 104. In a step S75, it is displayed on the monitor 106.

Then, the transmission request is transmitted to the next image transmission terminal. In the present embodiment, the transmission request is transmitted to the image transmission terminal 204 (step S76). This operation is repeated in sequence to the image transmission terminals 203–206.

In the second embodiment, the image receiving terminal 202 transmits the image transmission request to the image transmission terminals 203–206. The image transmission request is transmitted after the display of the image to prevent the reception of the image packet during the display of the image. Accordingly, the failure to receive the packet at the image receiving terminal is avoided. In the configuration of the second embodiment, the image control terminal shown in the first embodiment is not required.

Third Embodiment

In the first and second embodiments, during non-transmission period, the image is continuously inputted and compressed. In the present embodiment, this is avoided by issuing an image generating request in addition to the image transmission request to the image transmission terminal.

Figure 8:
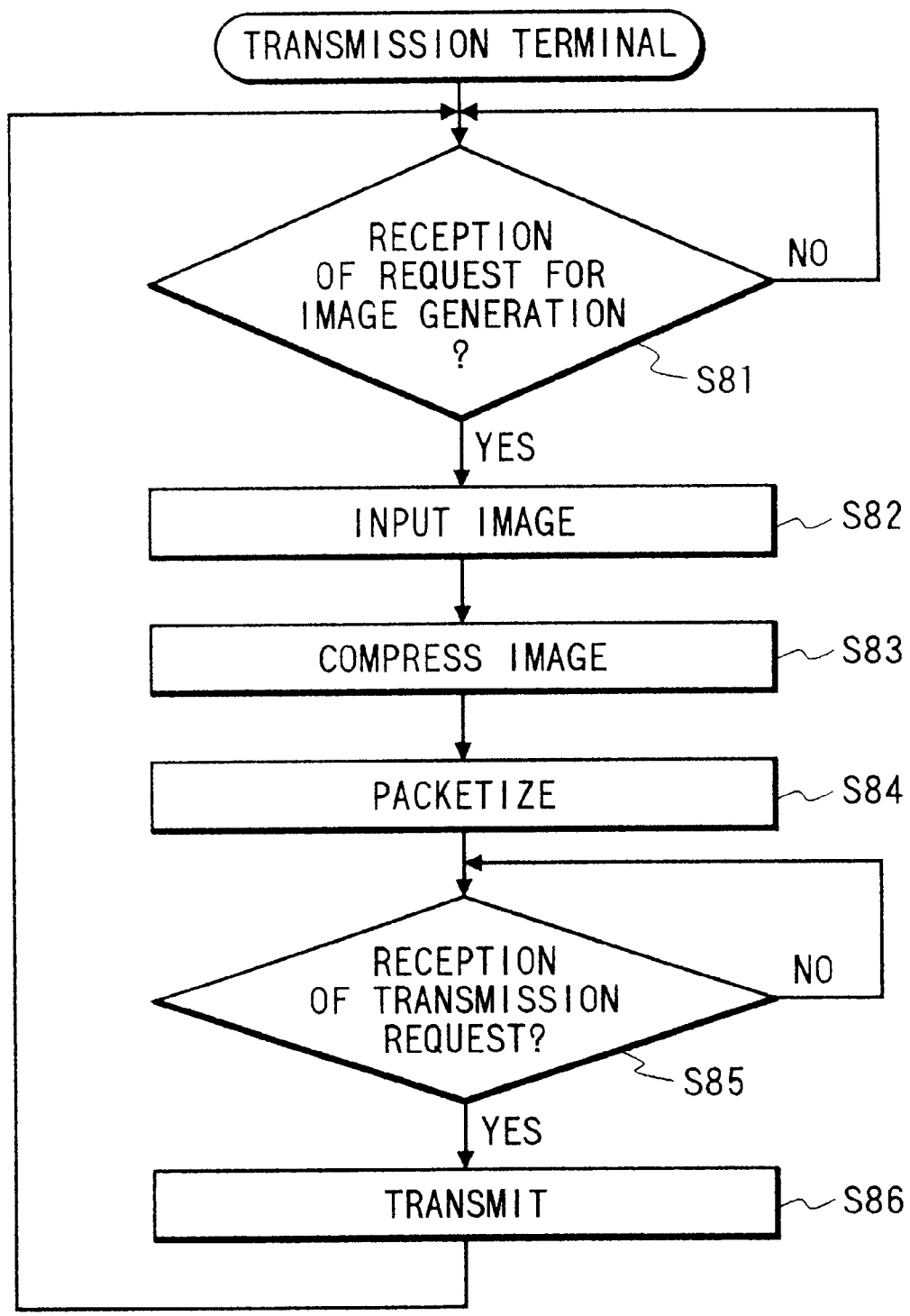
FIG. 8 shows a flow chart of an operation of an image transmission terminal in accordance with a third embodiment of the present invention.

Referring to FIGS. 8 and 1, an operation of the image transmission terminal is explained.

The reception of the image generating request packet is monitored (step S81).

When the image generating request packet is received, the process proceeds to a step S82 to input the image, from the image input unit 113.

The process then proceeds to a step S83 to compress the input image data by the image compress/expand circuit 104.

The compression image data is divided into sizes which can be transmitted over the network 120 and they are packetized by adding the network headers (step S84).

In a step S85, whether the image transmission request packet has been received or not is determined, and if the image transmission request packet has been received, the process proceeds to a step S86 to transmit the packetized image data.

Figure 9:
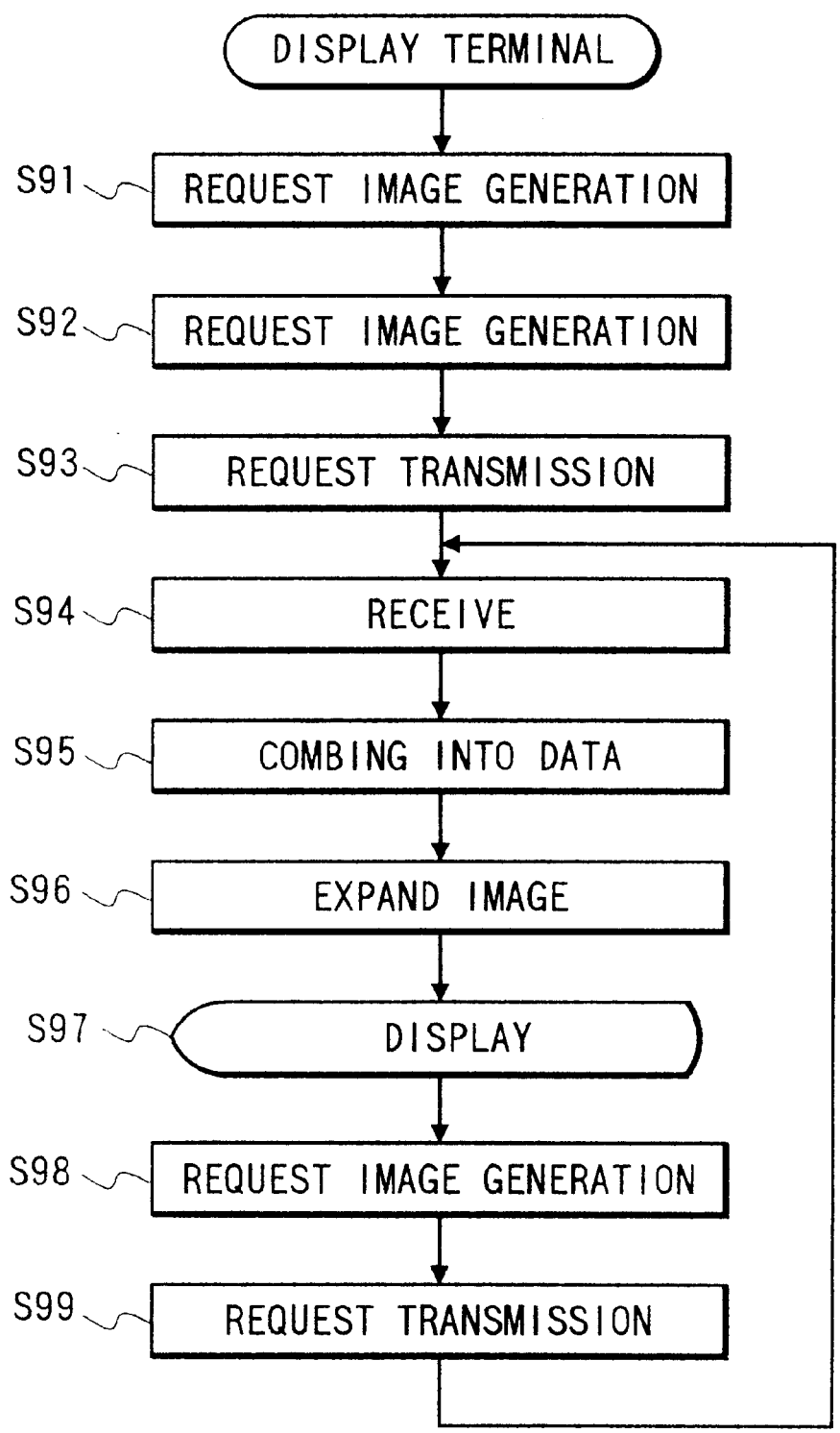
FIG. 9 shows a flow chart of an operation of an image receiving terminal in accordance with the third embodiment of the present invention.
Figure 10:
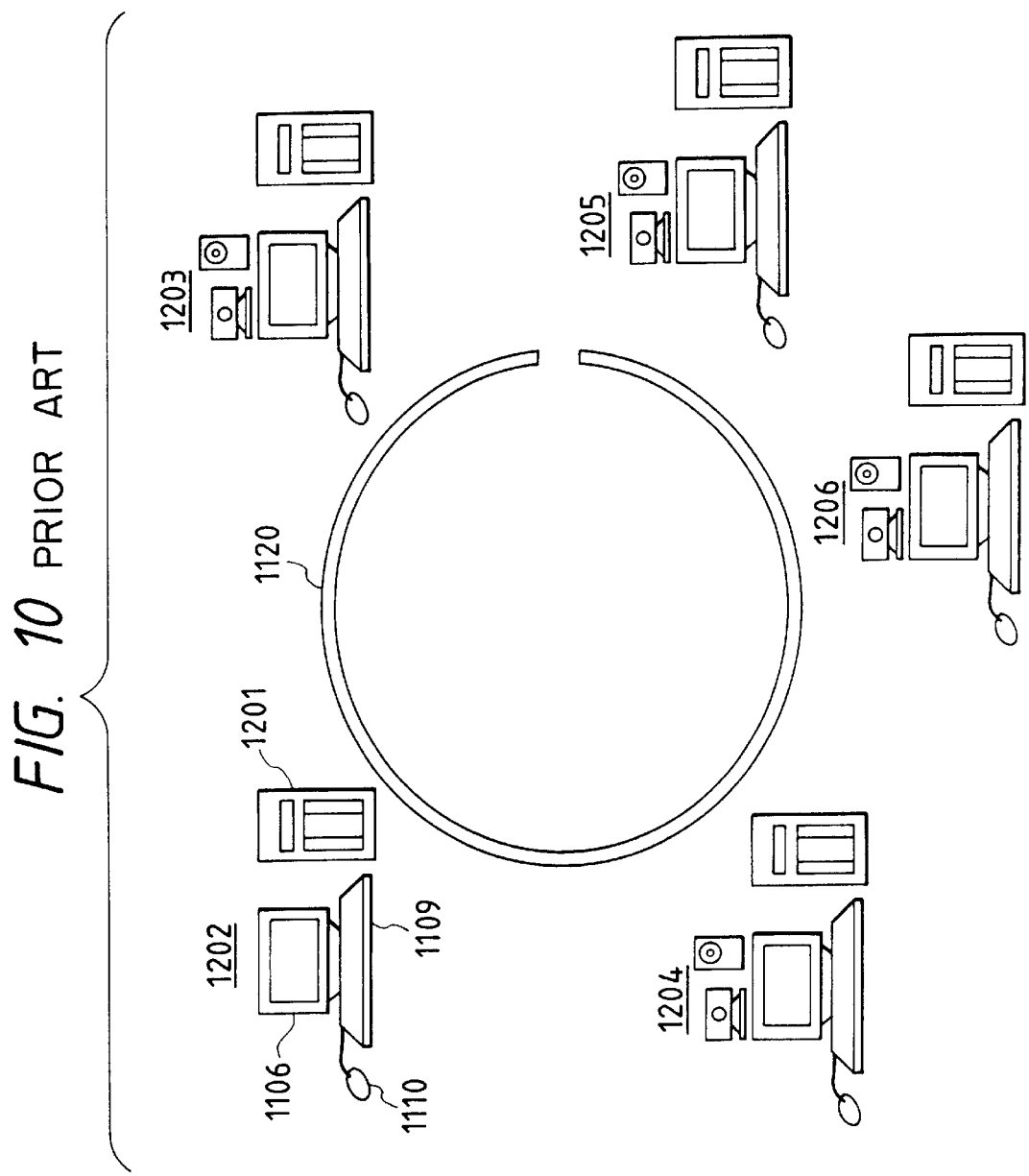
FIG. 10 shows a schematic view of a prior art multi-point image display system.

Referring to FIGS. 9 and 2, an operation of the image receiving terminal 202 is explained. In FIG. 2, it is assumed that 202 is the image receiving terminal.

Information for controlling the image transmission terminals 203–205 to transmit the images in order is stored in the external storage 111 of the image receiving terminal 202.

At the start, the image receiving terminal 202 transmits the image generating request to the first image transmission terminal 203 (step S91).

It also transmits the image generating request to the second image transmission terminal 204 (step S92).

In a step S93, it transmits the image transmission request to the first image transmission terminal 203 and waits for the reception of the image packet from the first image transmission terminal 203.

When it receives the image packet, it receives all of one screen of image packets transmitted from the image transmission terminal (step S94) and combines them into one data by removing the headers of the image packets (step S95).

Then, the image data compressed by the image transmission terminal is expanded by using the image compress/expand circuit 104 (step S96) and display it on the monitor 106 (step S97).

Then the image forming request is transmitted to the next image transmission terminal, in the present embodiment, the third image transmission terminal 205 (step S98) and the image transmission request is transmitted to the next or second image transmission terminal 204 (step S99).

This operation is repeated in order for the first to third image transmission terminals 203–205.
Namely, (a) The image forming request is transmitted to the second image transmission terminal 204 and the image transmission request is transmitted to the first image transmission terminal 203, (b) The image generating request is transmitted to the third image transmission terminal 205 and the image transmission request is transmitted to the second image transmission terminal 204, (c) The image generating request is transmitted to the first image transmission terminal 203 and the image transmission request is transmitted to the third image transmission terminal 205, and (d) The image generating request is transmitted to the second image transmission terminal 204 and the image transmission request is transmitted to the first image transmission terminal 203.

The operations (a)–(d) are repeated.

By the above configuration, the image transmission may be conducted without continuously operating the image input by the image transmission terminal.

According to the embodiments of the present invention, the image transmission request is noticed to the image transmission terminal when the transmission of the predetermined image units is completed so that the image packets from the image transmission terminals may be transmitted in sequence. Thus, the collision on the network is reduced and the loss of the image packet is significantly reduced.

Further, since the image units are set to one screen of the motion picture, the transmission units of the image packet may be set to one screen so that the operation for displaying the image may be conducted immediately after the completion of the reception of the image packet.

Further, since the image transmission request issuing means is provided in the image receiving terminal and the image transmission request is issued after the display of the image, the transmission of the image packet from the image transmission terminal is started after the completion of the operation for the display of the image by the image receiving terminal. Thus, the reception of the image packet during the display of the image is prevented and the loss of the image packet is prevented.

Further, since the image generating request notifying means for notifying the image generating request is provided and the image is generated by the image generating request notified by the image generating request notifying means, the input of the image and the generation of the image packet need be conducted only when the image generating request is received so that the load to the image transmission terminal is significantly reduced.

What is claimed is:

1. A communication apparatus which is connected with at least two communication partner apparatuses to execute image communication, said apparatus comprising:
a communication device adapted to transmit an image transmission request to a first communication partner apparatus and to receive a first image signal transmitted from the first communication partner apparatus according to the image transmission request; and
a memory to store control data so that image signals are transmitted in order from said each communication partner apparatus,
wherein said communication device transmits the image transmission request to a next communication partner apparatus according to the control data after receiving the first image signal.

2. An image communication apparatus according to claim 1, wherein said image signals are transmitted as an image packet.

3. An image communication apparatus according to claim 1, wherein said image signals are compressed.

4. A communication apparatus which is connected with at least two communication partner apparatuses to execute image communication, said apparatus comprising:
a communication device adapted to transmit an image transmission request to a first communication partner apparatus and to receive a first image signal transmitted from the first communication partner apparatus according to the image transmission request;
a memory to store control data so that image signals are transmitted in order from said each communication partner apparatus; and
an output device adapted to output the received first image signal to a display device,
wherein the first image signal is outputted to the display device after reception of the first image signal, and
wherein said communication device transmits the image transmission request to a next communication partner apparatus according to the control data after the output of the received first image signal.

5. An image communication apparatus according to claim 4, wherein said image signals are transmitted as an image packet.

6. An image communication apparatus according to claim 4, wherein said image signals are compressed.

7. An image communication apparatus according to claim 4, wherein said communication device transmits a command to transmit an image forming direction prior to the transmission of a command requesting the image transmission.

8. A communication method where a communication apparatus is connected with at least two communication partner apparatuses to execute image communication, said method comprising the steps of:
transmitting an image transmission request to a first communication partner apparatus:
receiving a first image signal transmitted from the first communication partner apparatus according to the image transmission request,
wherein the image transmission request is transmitted to a next communication partner apparatus according to the control data, which is stored in a memory so that image signals are transmitted from said each communication partner apparatus, after receiving the first image signal.

9. A communication method where a communication apparatus is connected with at least two communication partner apparatuses to execute image communication, said method comprising the steps of:
transmitting an image transmission request to a first communication partner apparatus;
receiving a first image signal transmitted from the first communication partner apparatus according to the image transmission request; and
outputting the received first image signal to a display,
wherein the first image signal is outputted to the display after reception of the first image signal, and
wherein the image transmission request is transmitted to a next communication partner apparatus according to the control data, which is stored in a memory so that the image signals are transmitted from said each communication partner apparatus, after the output of the received first image signal.

10. A communication apparatus which is connected with at least two communication partner apparatuses to execute image communication, said apparatus comprising:
a communication device adapted to transmit in order an image preparation request to each of said communication partner apparatuses; and to transmit an image transfer request to the communication partner apparatus which received the image preparation request; and to receive an image signal transferred according to the image transfer request; and
an output device adapted to output the transferred image signal,
wherein said communication device transmits the image preparation request to a next communication partner apparatus before transmission of the image transfer request to said communication partner apparatus which received the image preparation request.

11. An apparatus according to claim 10, wherein each of the communication apparatuses inputs the image signal in response to the reception of the image transmission preparation request and compresses the image signal.

12. An apparatus according to claim 10, wherein the image signal is a packet signal.

13. An apparatus according to claim 10, wherein said output device outputs an image corresponding to the received image signal on a display.

14. An apparatus according to claim 13, wherein the display executes a multi-image display for the image signal received from said communication partner apparatus.

15. An apparatus according to claim 11, wherein the compression is executed in any one of motion—JPEG, H261 or MPEG.

16. A communication method where a communication apparatus is connected with at least two communication partner apparatuses to execute image communication, said method comprising the steps of:
transmitting in order an image preparation request to each of said communication partner apparatuses;
transmitting an image transfer request to the communication partner apparatus which received the image preparation request; and
receiving an image signal transferred according to the image transfer request,
wherein the image preparation request is transmitted to a next communication partner apparatus before the image transfer request is transmitted to said communication partner apparatus which has received the image preparation request.

* * * * *